(12) United States Patent
Kugai et al.

(10) Patent No.: US 7,150,943 B2
(45) Date of Patent: Dec. 19, 2006

(54) INORGANIC SOLID ELECTROLYTE AND LITHIUM CELL COMPONENT

(75) Inventors: Hirokazu Kugai, Itami (JP); Nobuhiro Ota, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 462 days.

(21) Appl. No.: 10/380,839

(22) PCT Filed: Feb. 22, 2002

(86) PCT No.: PCT/JP02/01636

§ 371 (c)(1), (2), (4) Date: Mar. 19, 2003

(87) PCT Pub. No.: WO02/069433

PCT Pub. Date: Sep. 6, 2002

(65) Prior Publication Data

US 2004/0005504 A1    Jan. 8, 2004

(30) Foreign Application Priority Data

Feb. 28, 2001  (JP)  ............................... 2001-53614
Feb. 12, 2002  (JP)  ............................... 2002-33336

(51) Int. Cl.
*H01M 6/18* (2006.01)

(52) U.S. Cl. ..................... 429/304; 429/322; 423/303; 252/62.2

(58) Field of Classification Search ................ 429/304, 429/231.95, 126, 322; 282/62.2; 423/303
See application file for complete search history.

(56) References Cited

U.S. PATENT DOCUMENTS

| | | | |
|---|---|---|---|
| 5,314,765 A | 5/1994 | Bates | |
| 5,677,081 A | 10/1997 | Iwamoto et al. | |
| 6,025,094 A | 2/2000 | Visco et al. | |
| 6,093,503 A * | 7/2000 | Isoyama et al. | 429/231.95 |
| 6,200,707 B1 * | 3/2001 | Takada et al. | 429/304 |
| 6,365,300 B1 | 4/2002 | Ota et al. | |

FOREIGN PATENT DOCUMENTS

| EP | 1 052 718 | 11/2000 |
|---|---|---|
| JP | 4-231346 | 8/1992 |
| JP | 5-48582 | 7/1993 |
| JP | 06-279049 A | 10/1994 |
| JP | 07-245099 A | 9/1995 |
| JP | 2000-340257 A | 12/2000 |
| JP | 2001-250580 | 9/2001 |
| JP | 3343936 | 8/2002 |

OTHER PUBLICATIONS

"Supersonic Conduction in $Li_2S$-$P_2S_5$-LiI-Glasses", Rene Mercier, et al., Solid State Ionics 5 (1981), North Holland Publishing Company, pp. 663-666.

"Preparation of $Li_2S$-$P_2S_5$ Amorphous Solid Electrolytes by Mechanical Milling", Akitoshi Hayashi, et al., J. Am. Ceram. Soc. 84 [2], pp. 477-479, (2001).

"Synthesis and High Lithium Ion Conductivity of New Glass-ceramics in the System $Li_2S$-$P_2S_5$", Shigenori Hama, et al., The 26th Symposium on Solid State Ionics in Japan, Extended Abstracts, pp. 174-175.

"Inorganic Solid Electrolyte", Denki Kagaku 65, No. 11 (1997) pp. 914-919 (w/ partial English translation) (Previously submitted on Mar. 19, 2003).

International Search Report dated Jul. 27, 2006.

* cited by examiner

*Primary Examiner*—Laura Weiner
(74) *Attorney, Agent, or Firm*—McDermott Will & Emery LLP

(57) ABSTRACT

A sulfide-based inorganic solid electrolyte that suppresses the reaction between silicon sulfide and metallic lithium even when the electrolyte is in contact with metallic lithium, a method of forming the electrolyte, and a lithium battery's member and lithium secondary battery both incorporating the electrolyte. The electrolyte comprises Li, P, and S without containing Si. It is desirable that the oxygen content vary gradually from the electrolyte to the lithium-containing material at the boundary zone between the two members when analyzed by using an XPS having an analyzing chamber capable of maintaining a super-high vacuum less than $1.33 \times 10^{-9}$ h Pa and that the oxygen-containing layer on the surface of the lithium-containing material be removed nearly completely. The electrolyte can be formed such that at least part of the forming step is performed concurrently with the step for etching the surface of the substrate by irradiating the surface with inert-gas ions.

9 Claims, No Drawings

INORGANIC SOLID ELECTROLYTE AND LITHIUM CELL COMPONENT

TECHNICAL FIELD

The present invention relates to an inorganic solid electrolyte and a method of forming the electrolyte. The present invention also relates to a lithium battery's member and a lithium secondary battery both incorporating the electrolyte.

BACKGROUND ART

Lithium secondary batteries incorporating organic electrolysis solutions have been widely used. They are advantageous in that they have high energy output per unit volume or unit weight in comparison with other batteries. In exploiting this advantage, researchers and engineers have been advancing the development for practical applications of the lithium secondary batteries as power sources for mobile communications devices, notebook-type personal computers, and electric cars.

To improve the performance of a lithium secondary battery, attempts have been made to use metallic lithium as the negative electrode. However, the repetition of charge and discharge causes dendritic metallic lithium to grow on the surface of the negative electrode. This may lead to an internal short circuit between the negative and positive electrodes, ultimately triggering explosion. To suppress the possibility of this dangerous situation, engineers have studied the formation of a thin sulfide-based inorganic solid electrolytic layer on the metallic lithium. An example of this study has been disclosed in the published Japanese patent application Tokukai2000-340257.

The technology on the solid electrolyte for lithium batteries and other applications has been disclosed, for example, in "Solid State Ionics, 5 (1981) 663–666," "DENKI KAGAKU(Japanese expression meaning electrochemistry) 65, No. 11 (1997) 914–919," the published Japanese patent application Tokukai 2001-250580, "J. Am. Ceram. Soc., 84 [2] 477–79 (2001)," the published Japanese patent application Tokukaihei 5-48582, the published Japanese patent application Tokukaihei 4-231346, "The 26th Symposium on Solid State Ionics in Japan, Extended Abstracts (2000) 174–175," U.S. Pat. No. 6,025,094, and U.S. Pat. No. 5,314,765.

On the other hand, it has been revealed that when a thin sulfide-based inorganic solid electrolytic layer containing silicon sulfide is in contact with metallic lithium, the silicon in the silicon sulfide ($SiS_2$) is reduced by the metallic lithium, and consequently the inorganic solid electrolyte degrades with time even at room temperature.

Generally, a compound layer having low ionic conductivity, such as an oxide layer, is formed on the surface of metallic lithium. When the oxide layer is formed, the reaction between the metallic lithium and the silicon sulfide tends to be suppressed. Therefore, if the oxide layer is removed to improve the performance of the battery, the inorganic solid electrolyte degrades distinctly with time due to the reaction between the metallic lithium and the silicon sulfide.

DISCLOSURE OF INVENTION

A principal object of the present invention is to offer (a) a sulfide-based inorganic solid electrolyte that suppresses the reaction between silicon sulfide and metallic lithium even when the electrolyte is in contact with metallic lithium and (b) a method of forming the electrolyte. Another principal object of the present invention is to offer a battery's member and a lithium secondary battery both incorporating the electrolyte.

The present invention is based on the findings that the metallic lithium reacts with the silicon sulfide ($SiS_2$) at room temperature, degrading the inorganic solid electrolyte. The present invention attains the foregoing object by offering an inorganic solid electrolyte containing no Si.

<Inorganic Solid Electrolyte>

According to the present invention, the inorganic solid electrolyte comprises Li, P, and S without containing Si. In particular, it is desirable that the electrolyte comprise:
(a) at least 20 atom. % and at most 60 atom. % Li; and
(b) the remainder comprising P and S without containing Si.

It is more desirable that the electrolyte comprise:
(a) at least 25 atom. % and at most 60 atom. % Li; and
(b) the remainder comprising P and S without containing Si.

The expression "to comprise elements A, B, and so on "is used throughout Description, Claims, and Abstract to mean "to comprise elements A, B, and so on together with unavoidable impurities."

It is desirable that Si not be contained in the vitreous framework of the inorganic solid electrolyte. It was generally accepted that Si was inevitably contained in a thin sulfide-based inorganic solid electrolytic layer. However, it was not known that the Si adversely affected the performance of the inorganic solid electrolyte. Consequently, no countermeasures were taken. On the other hand, the present invention eliminates the Si from the inorganic solid electrolyte to suppress the electrolyte from degrading with time due to the reaction between the metallic lithium and the silicon sulfide. In the above description, the term "to eliminate the Si" is used to mean "to reduce the Si content to less than 1 atom. %."

A lithium-phosphorus-sulfur-based inorganic solid electrolyte containing no silicon is superior to other sulfide-based inorganic solid electrolytes, particularly sulfide-based inorganic solid electrolytes containing silicon, because it has the following advantages:
1. It has high ionic conductivity.
2. Unlike a sulfide-based inorganic solid electrolyte containing silicon, even when placed in contact with metallic lithium, it does not react with the metallic lithium.
3. When a negative electrode is produced by forming it on metallic lithium for use in a lithium secondary battery having a nonaqueous organic electrolysis solution, it has the following properties:
   (a) It is excellent in suppressing the growth of dendrites.
   (b) It is excellent in chemical stability against the electrolysis solution.
   (c) It has high mechanical strength against the morphology shift during charge-and-discharge cycles.
4. As opposed to costly $SiS_2$, phosphorus sulfide ($P_2S_5$) is comparatively low-cost, easily available, and therefore suitable for industrial production.

The present invention specifies that the content of the element lithium in the inorganic solid electrolytic layer be at least 20 atom. % and at most 60 atom. %. If the content is less than 20 atom. %, the ionic conductivity is decreased, and the inorganic solid electrolytic layer comes to have high resistance. In addition, the bonding strength between the electrolytic layer and the metallic-lithium layer decreases. On the other hand, if the content is more than 60 atom. %, although the bonding strength between the electrolytic layer and the metallic-lithium layer increases, the electrolytic layer is polycrystallized and becomes porous, making it difficult to form a dense continuous layer of an inorganic solid electrolyte. Furthermore, the electrolytic layer comes to have electronic conductivity and thereby causes internal short-circuiting when used to produce a battery, decreasing the performance of the battery. In other words, it is desirable that the electrolytic layer be amorphous. Throughout Description and Claims, the expression "the electrolytic layer or electrolyte is amorphous" is used to mean that "the electrolytic layer or electrolyte is made of a substantially amorphous (vitreous) material." More specifically, the foregoing amorphous state includes the following cases when examined by the X-ray diffraction method:

(a) A halo pattern is observed.
(b) In addition to a halo pattern, tiny peaks are observed due to the starting materials and reaction products (this phenomenon is observed when crystal grains are partly produced from the starting materials and reaction products).
(c) Peaks are observed due to the substrate for the thin-layer formation.

It is desirable that the content of the element phosphorus be at least 3 atom. % and at most 20 atom. %. It is desirable that the content of the element sulfur be at least 30 atom. % and at most 60 atom. %. If the contents of phosphorus and sulfur are insufficient, defects tend to occur. If the contents of phosphorus and sulfur are excessive, the amounts of free phosphorus and free sulfur increase as impurities in the solid electrolyte.

It is desirable that a specific compound to be contained in the inorganic solid electrolyte of the present invention be a compound of lithium sulfide ($Li_2S$) and phosphorus sulfide ($P_2S_5$). In particular, it is desirable that the ratio X/Y be at least 1.0 and at most 19, where X denotes the ratio of the constituent lithium (Li), and Y denotes the ratio of the constituent phosphorus (P).

The inorganic solid electrolyte may contain oxygen, nitrogen, or both. When the inorganic solid electrolyte contains about 5 atom. % or less oxygen or nitrogen, it can exhibit high lithium-ion conductivity. This is attributed to the fact that the small amounts of oxygen or nitrogen atoms widen the interstices of the formed amorphous framework, reducing the interference to the movement of the lithium ions.

The types of compounds containing oxygen include $Li_3PO_4$, $Li_2SO_4$, $Li_2O$, and $P_2O_5$. The types of compounds containing nitrogen include $Li_3PO_{4-x}N_{2x/3}$ (0<X<4).

It is desirable that the inorganic solid electrolyte be in the shape of a thin layer. It is desirable that the thin layer have a thickness of at least 0.01 μm and at most 10 μm, more desirably at least 0.05 μm and at most 1 μm. If the thin layer is excessively thin, defects such as pinholes increase. If the thin layer is excessively thick, it requires prolonged processing time, increasing the production cost.

<Member of Lithium Battery>

It is desirable that the foregoing inorganic solid electrolyte be formed on the surface of metallic lithium or a lithium alloy (lithium-containing material) so that it can be used as a member of a battery. The types of lithium alloys include alloys of Li and another element such as In, Ti, Zn, Bi, and Sn.

A thin metal layer made of a metal that forms an alloy or intermetallic compound with lithium, such as Al, In, Bi, Zn, or Pb, may be formed on the surface of the lithium-containing material. When the thin metal layer and the lithium-containing material are used to constitute a negative electrode, the metallic lithium travels smoothly at the time of charge and discharge, and the utilizing thickness for the metallic lithium increases. In addition, this structure can equalize the dimensional change in the negative electrode at the time of charge and discharge, reducing the strain given to the electrolytic layer.

The foregoing lithium-containing material may be used without any pre-treatment when the electrolytic layer is formed. However, the surface of metallic lithium is generally covered by thin layers such as an oxide (such as $Li_2O$) layer, a carbonate ($Li_2CO_3$) layer, and a hydroxide (LiOH) layer. These layers have low lithium-ion conductivity, and therefore it is desirable to remove them. They can be removed by irradiating inert-gas-ion beams such as argon-ion beams. It is desirable that the argon gas for this purpose have extremely high purity. For example, it is desirable to use an argon gas having a purity of 99.9999%.

This pretreatment enables the formation of the thin inorganic solid electrolytic layer directly on the lithium-containing material, thereby reducing the impedance between them.

In particular, it is desirable to perform at least part of the step for forming the thin inorganic solid electrolytic layer concurrently with the step for etching the surface of the substrate by irradiating the surface with inert-gas ions. This thin-layer-forming method enables the production of a lithium battery member in which:

(a) the oxygen content varies gradually from the inorganic solid electrolyte to the lithium-containing material at the boundary zone between the electrolyte and the lithium-containing material when analyzed by using an X-ray photo-electronic spectroscope (XPS) equipped with an analyzing chamber capable of maintaining a super-high vacuum less than $1.33 \times 10^{-9}$ hPa ($1 \times 10^{-9}$ Torr); and
(b) the oxide layer on the surface of the lithium-containing material is removed nearly completely.

An example of the foregoing XPS is Type 5400 produced by Physical Electronics, Inc.

When a thin electrolytic layer is formed after finishing the etching step (this is the conventional method) by using an ordinary vacuum unit having an attainable vacuum degree of about $1.3 \times 10^{-7}$ hPa ($1 \times 10^{-7}$ Torr), an oxygen-containing layer, such as an oxide layer, a carbonate layer, and a hydroxide layer, tends to be formed between the lithium-containing material and the inorganic solid electrolyte. According to the present invention, on the other hand, at least part of the step for forming the thin electrolytic layer is performed concurrently with the etching step. This method enables the nearly complete elimination of the oxygen-containing layer even with the ordinary vacuum unit.

Although the etching step and the entire step for forming the thin electrolytic layer may be carried out concurrently, it is desirable to start the step for forming the thin electrolytic layer a short time before the etching step finishes. In other words, after the etching step nearly completely removes the oxygen-containing layer on the surface of the substrate, the formation of the thin electrolytic layer starts under the condition that prohibits the formation of an oxygen-containing layer. In this case, the thin electrolytic layer is formed while part of it is removed by the inert-gas ions.

When the etching step is carried out separately, the time period for the etching is determined by estimating the time for nearly completely removing the oxygen-containing layer on the surface of the substrate. When the step for forming the thin electrolytic layer starts a short time before the etching step finishes, the time period for the overlapping is determined by estimating the time for covering the entire surface of the substrate with the material of the thin electrolytic layer.

There is an alternative method. After the nearly complete removal of the oxygen-containing layer, a nitride layer such as a lithium nitride ($Li_3N$) layer may be formed before the thin electrolytic layer is formed. $Li_3N$ has an ionic conductivity of $1×10^{-3}$ S/cm or more. Therefore, the presence of the $Li_3N$ layer between the metallic lithium and the thin inorganic solid electrolytic layer does not reduce the allowable current density. The nitride layer can be expected to suppress the formation of other compound layers such as an oxide layer.

The nitride layer can be formed, for example, by treating the lithium-containing material with argon-nitrogen-mixed-ion beams. The nitride layer has only to be formed with a minimal thickness on the surface of the lithium-containing material without leaving unnitrided spots. It is desirable that the nitride layer have a thickness of at least 1 nm. On the other hand, if the nitride layer is excessively thick, it creates various problems such as a reduction in ionic conductivity due to polycrystallization, a reaction with the electrolysis solution, and a reduction in voltage-withstanding strength. Consequently, it is desirable that the nitride layer have a thickness of at most 0.1 µm (100 nm), more desirably at most 10 nm.

<Lithium Secondary Battery>

The foregoing battery member can be used as a negative electrode of a lithium secondary battery. For example, a lithium secondary battery can be produced by (a) laminating a positive electrode, a porous separator, and a negative electrode, (b) impregnating the laminated body with a non-aqueous electrolysis solution, and (c) housing the laminated body in a battery case to seal it. The above process is more specifically explained below. First, the negative electrode is bonded with a negative-electrode-side collector. A thin inorganic solid electrolytic layer containing no organic electrolysis solution is formed on a lithium-containing material used as the negative electrode. Thus, a bonded body of the negative electrode and the thin electrolytic layer is produced. Second, a material containing an organic high polymer is formed on a positive-electrode-side collector (copper or aluminum foil, for example) to obtain the positive electrode. Finally, the foregoing bonded body is coupled with the positive electrode through the separator to produce the lithium secondary battery. This structure enables the reduction in the contact resistance between the negative electrode and the electrolytic layer and between the positive electrode and the electrolytic layer, attaining a good charge-and-discharge performance. In addition to the button-type battery in which the components are laminated in the above-described manner, a cylindrical battery may be produced by rolling up a laminated body of the negative electrode, the electrolytic layer, and the positive electrode.

The separator to be placed between the positive electrode and the solid electrolytic layer must be made of a material that has pores in which lithium ions can travel and that is stable without dissolving in an organic electrolysis solution. The separator may be produced by using, for instance, a nonwoven fabric or porous body formed of a material such as polypropylene, polyethylene, fluororesin, or polyamide resin. A metal oxide film having pores may also be used.

<Method of Forming Inorganic Solid Electrolyte>

According to the present invention, an inorganic solid electrolyte is formed by forming a thin inorganic solid electrolytic layer on a substrate. More specifically, a thin inorganic solid electrolytic layer comprising Li, P, and S without containing Si is formed while the substrate is heated at a temperature of at lowest 40° C. and at highest 180° C. Alternatively, after the same electrolytic layer as described above is formed on a substrate at a temperature lower than 40° C., the substrate having the formed electrolytic layer is heated at a temperature of at lowest 40° C. and at highest 180° C. It is desirable that the inorganic solid electrolyte comprise:

(a) at least 20 atom. % and at most 60 atom. % Li; and
(b) the remainder comprising P and S.

It is more desirable that the inorganic solid electrolyte comprise:

(a) at least 25 atom. % and at most 60 atom. % Li; and
(b) the remainder comprising P and S.

As described above, a thin inorganic solid electrolytic layer having high ionic conductivity can be obtained by heating the substrate while the electrolytic layer is formed or by heating the electrolytic layer after it is formed at room temperature. On the other hand, if an inorganic solid electrolyte containing Si is formed on the surface of a lithium-containing material while the substrate is heated or if the same electrolyte is heated after it is formed, the reaction between the Li and the Si is undesirably promoted. As distinguished from this case, the present invention specifies the method in which an inorganic solid electrolyte containing no Si is formed on the surface of a lithium-containing material. The above-described heat treatment on this electrolyte of the present invention can give the electrolyte good properties such as high ionic conductivity. Therefore, this heat treatment is particularly effective. Furthermore, when a thin inorganic solid electrolytic layer is formed while the substrate is heated, other effects such as the increase in the bonding strength between the thin electrolytic layer and the substrate can be expected.

It is desirable that the foregoing thin inorganic solid electrolytic layer be formed by any of the sputtering method, the vacuum evaporation method, the laser abrasion method, and the ion plating method.

BEST MODE FOR CARRYING OUT THE INVENTION

Embodiments of the present invention are explained below.

EXAMPLE 1

A thin metallic-lithium layer having a thickness of 10 µm was formed by the vacuum evaporation method on a sheet of copper foil having a thickness of 10 µm, a length of 100 mm, and a width of 50 mm. A thin inorganic solid electrolytic layer was formed on the surface of the thin metallic-lithium layer. In place of the thin metallic-lithium layer, a sheet of metallic-lithium foil having the same length and width as those of the sheet of copper foil and a thickness of 30 µm may be laminated with the sheet of copper foil. In this case, a thin inorganic solid electrolytic layer is formed on the sheet of metallic-lithium foil.

The process of the foregoing formation of the thin electrolytic layer is explained in detail below. The substrate having the formed thin metallic-lithium layer was placed in a vacuum thin-layer-forming unit. The attainable vacuum degree of the unit was $5.3\times10^{-7}$ hPa ($4\times10^{-7}$ Torr). First, while an argon gas having a purity of 99.9999% was fed into the unit such that a gas pressure of $2.7\times10^{-4}$ hPa ($2\times10^{-4}$ Torr) could be maintained, the surface of the sample was irradiated with ion beams for 30 seconds with an ion gun at 15 mA and 500 V. After the 30-second irradiation, the thin-layer formation of an inorganic solid electrolyte was started by the laser abrasion method without stopping the ion-beam irradiation. More specifically, the ion-beam irradiation was performed continuously for 40 seconds in total. The additional 10-second period was overlapped with the thin-layer formation of the inorganic solid electrolyte. The first 30-second period was for the removal of an oxide layer, a carbonate layer, and other compound layers formed on the metallic lithium.

If the thin-layer formation is started some time after finishing the ion-beam irradiation, the oxygen remaining in a vacuum container tends to form a very thin oxide layer on the surface of the metallic lithium when the thin-layer formation is performed by using an ordinary vacuum unit having an attainable vacuum degree of about $1.3\times10^{-7}$ hPa ($1\times10^{-7}$ Torr). To avoid this oxide-layer formation, the ion-beam irradiation and the thin-layer formation were performed concurrently during the last 10-second period.

After finishing the ion-beam irradiation, the thin-layer formation was continued. Within three minutes, the argon gas pressure was increased to $2.7\times10^{-3}$ hPa ($2\times10^{-3}$ Torr), and the temperature was raised from room temperature to 140° C. Under these conditions, an inorganic solid electrolyte having a thickness of 0.5 μm was formed. The thin-layer formation was performed by using a KrF excimer laser with a laser-oscillating frequency of 5 Hz.

The above-described conditions for the ion-beam irradiation, such as an electric current, a time period, and a gas pressure, are merely an example. They must be adjusted in accordance with the total thickness of an oxide layer, a carbonate layer, and other compound layers formed on the surface of the metallic lithium, the distance between the ion gun and the sample, and other specific conditions.

If a thin inorganic solid electrolytic layer is formed by using a vacuum unit that can attain a super-high vacuum less than $1.33\times10^{-9}$ hPa ($1\times10^{-9}$ Torr) and that has an extremely small amount of adsorbed oxygen and water vapor in the unit, a thin inorganic solid electrolytic layer may be formed practically without forming compound layers such as an oxide layer on the surface of the metallic lithium even when the thin-layer formation is started some time after the finishing of the ion-beam irradiation. However, the production of such a vacuum unit requires extremely sophisticated techniques, and its price would be prohibitive if it were produced. This is the reason why the above-described method was employed.

Two types of inorganic solid electrolytes were produced: Sample A was produced by using an Si-containing target composed of $63Li_2S-36.5SiS_2-0.5Li_3PO_4$ (numerals before the compounds represent the mole ratio), and Sample B was produced by using an Si-free target composed of $78Li_2S-21.5P_2S_5-0.5Li_3PO_4$.

Observations of the samples after the thin-layer formation revealed that the thin electrolytic layer of Sample A degraded to an intense black discoloration (Usually, a good $Li_2S$—$SiS_2$-based thin electrolytic layer is colorless and transparent). Its ionic conductivity was less than $1\times10^{-4}$ S/cm at 25° C., revealing that the direct contact with the metallic lithium caused the reaction between the Si and the metallic lithium and thereby degraded the thin solid electrolytic layer. The ionic conductivity was measured in a direction perpendicular to the plane of the layer by the DC measuring method.

On the other hand, the thin solid electrolytic layer of Sample B was colorless and transparent, and its ionic conductivity was $1.3\times10^{-3}$ S/cm at 25° C. The ionic conductivity was measured by the same method as in Sample A. In Sample B, the ratio of the constituent Li (atom. %) was 41% when analyzed by an electron probe micro analyzer (EPMA). (The composition (atom. %) of a thin electrolytic layer is usually analyzed by the foregoing EPMA, the X-ray photo-electronic spectroscope (XPS), the inductively coupled plasma (ICP) emission spectral analysis, or the gas analysis by the inert-gas fusion infrared absorption method.) In addition, another thin electrolytic layer was formed on a glass substrate under the same thin-layer-forming conditions as in Sample B. The ratio of the constituent Li, X, and the ratio of the constituent P, Y, of this layer were determined by an ICP spectral analyzer. The calculated ratio X/Y was 3.6. The ICP spectral analyzer used for this measurement was Type SPS1200VR produced by Seiko Instrument Inc. An X-ray diffraction analysis showed only tiny peaks except the peaks from the substrate, confirming that Sample B was amorphous.

An analysis of the composition from the inorganic solid electrolytic layer to the thin metallic-lithium layer was conducted by using an XPS that was equipped with an analyzing chamber capable of maintaining a super-high vacuum less than $1.33\times10^9$ hPa ($1\times10^{-9}$ Torr). The XPS used for the analysis was Type 5400 produced by Physical Electronics, Inc. The analysis confirmed that the oxygen content varied (decreased) gradually from the electrolytic layer to the lithium layer at the boundary zone between the two layers. It was also confirmed that the oxide layer on the surface of the metallic lithium was removed nearly completely before the formation of the inorganic solid electrolytic layer.

A negative electrode was produced by using a substrate having a thin inorganic solid electrolytic layer formed on the thin metallic-lithium layer by using a target composed of $78Li_2S-21.5P_2S_5-0.5Li_3PO_4$. A lithium secondary battery was produced by incorporating the negative electrode, a separator made of porous polymer film, a positive electrode, an organic electrolysis solution, and so on. The production process and evaluation results of the battery are described below.

An electrolyte, $LiPF_6$, was dissolved in a mixed liquid of ethylene carbonate (EC) and propylene carbonate (PC). The mixed liquid containing $LiPF_6$ was heated to further dissolve polyacrylonitrile (PAN) in high concentration. The mixed liquid was cooled to obtain a gelatinous electrolyte comprising $LiPF_6$, EC, PC, and PAN. A powder of $LiCoO_2$ for acting as an active material and a carbon powder giving electronic conductivity were mixed into the gelatinous electrolyte. The gelatinous electrolyte was applied onto a sheet of aluminum foil (a positive-electrode-side collector), 20 μm in thickness, to obtain a positive electrode. The layer of the gelatinous electrolyte had a thickness of 300 μm.

The negative electrode on which the thin solid electrolytic layer was formed, a separator made of porous polymer film, and the positive electrode were placed in layers in a hermetically sealable stainless steel container. An organic electrolysis solution was produced by dissolving 1 mole % $LiPF_6$ as an electrolytic salt in a mixed solution of ethylene carbonate and propylene carbonate. The organic electrolysis solution was dropped into the container. The lithium secondary battery was completed in an argon gas atmosphere having a dew point lower than −60° C.

The charge-and-discharge performance of the produced battery was evaluated. The battery showed the following results: With a charged voltage of 4.2 V, when the battery was discharged at a rate of 100 mA, it showed a current capacity of 0.5 Ah (ampere hour) before the terminal voltage decreased to 3.0 V. The energy density was 500 Wh/l (watt hour/liter).

The charge-and-discharge cycle was repeated under the same condition as described above. The battery was stable after more than 600 cycles. Even after 600 cycles, it retained more than 50% of the initial capacity.

EXAMPLE 2

A thin metallic-lithium layer having a thickness of 10 μm was formed by the vacuum evaporation method on a sheet of copper foil having a thickness of 10 μm, a length of 100 mm, and a width of 50 mm. A thin inorganic solid electrolytic layer having a thickness of 0.5 μm was formed on the surface of the thin metallic-lithium layer. As with Example 1, a sheet of metallic-lithium foil may be laminated with the sheet of copper foil.

The process of the foregoing formation of the thin electrolytic layer is explained in detail below. The substrate having the formed thin metallic-lithium layer was placed in a vacuum unit to treat with ion beams. While a mixed gas of argon and nitrogen (argon: 75 vol. %, nitrogen: 25 vol. %) was fed into the unit such that a gas pressure of $2.7 \times 10^{-4}$ hPa ($2 \times 10^{-4}$ Torr) could be maintained, the surface of the sample was irradiated with ion beams with an ion gun at 15 mA and 500 V. It is desirable that the mixed gas have a nitrogen content of at least 10 vol. % and at most 50 vol. %. If the nitrogen content is insufficient, the nitriding effect is insufficient, and if the nitrogen content is excessive, the filament of the ion gun deteriorates notably. An analysis with an XPS showed that the formed nitride layer had a thickness of 1 nm.

In the above-described process, the etching treatment for removing an oxide layer and other compound layers and the nitriding treatment were performed concurrently by using an argon-nitrogen-mixed gas. As an alternative, however, after finishing the etching treatment by using only an argon gas, a thin lithium nitride layer or another thin nitride layer may be formed by the vapor deposition method. As yet another alternative, the formation of a nitride layer may be started in the latter part of the ion-beam irradiation period so that the etching treatment by the ion-beam irradiation and the nitride-layer formation can be performed concurrently.

Next, a thin inorganic solid electrolytic layer was formed on the nitrided thin metallic-lithium layer. The condition for forming the thin electrolytic layer was varied to obtain various samples as shown in Tables 1 and 2. When the thin-layer formation was performed at room temperature without heating the substrate, the sample after the thin-layer formation was heat-treated at a temperature shown in Table 2 for 15 minutes in an argon gas at atmospheric pressure. The following data were taken on the obtained thin inorganic solid electrolytic layers: (a) the ratio of the constituent Li (atom. %), (b) the ionic conductivity at 25° C., and (c) the ratio X/Y (expressed as an Li/P ratio in Table 1) calculated by using the ratio of the constituent Li, X, and the ratio of the constituent P, Y. The ratio of the constituent Li was obtained by using an EPMA. The ratio X/Y was obtained by an ICP analysis. The ICP analysis was carried out by analyzing another thin inorganic solid electrolytic layer formed on a glass or sapphire substrate under the same thin-layer-forming condition. These data are also included in Tables 1 and 2. In all Samples except Sample Nos. 2—2 and 2-8, the ratio of the constituent P was at least 3 atom. % and at most 20 atom. %, and the ratio of the constituent S was at least 30 atom. % and at most 60 atom. %.

TABLE 1

| No. | Thin-layer-forming method | Material for thin inorganic solid electrolytic layer (Mole ratio) | Ratio of constituent Li (atom. %) | L/P ratio |
|---|---|---|---|---|
| 2-1 | Vacuum evaporation | $78Li_2S-22P_2S_5$ | 40 | 3.5 |
| 2-2 | Vacuum evaporation | $96.5Li_2S-3P_2S_5-0.5Li_3PO_4$ | 62 | 32 |
| 2-3 | Vacuum evaporation | $94.5Li_2S-5P_2S_5-0.5Li_3PO_4$ | 60 | 19 |
| 2-4 | Vacuum evaporation | $85Li_2S-14.5P_2S_5-0.5Li_3PO_4$ | 48 | 5.9 |
| 2-5 | Vacuum evaporation | $78Li_2S-21.5P_2S_5-0.5Li_3PO_4$ | 41 | 3.6 |
| 2-6 | Vacuum evaporation | $65Li_2S-34.5P_2S_5-0.5Li_3PO_4$ | 30 | 1.9 |
| 2-7 | Vacuum evaporation | $60Li_2S-39.5P_2S_5-0.5Li_3PO_4$ | 27 | 1.5 |
| 2-8 | Vacuum evaporation | $48.0Li_2S-51.5P_2S_5-0.5Li_3PO_4$ | 19 | 0.9 |
| 2-9 | Vacuum evaporation | $78Li_2S-21.5P_2S_5-0.5Li_3SO_4$ | 41 | 3.6 |
| 2-10 | Vacuum evaporation | $78Li_2S-21.5P_2S_5-0.5(Li_2O-P_2O_5)$ | 41 | 3.6 |
| 2-11 | Vacuum evaporation | $78Li_2S-21.5P_2S_5-0.5Li_3PO_{3.9}N_{0.1}$ | 41 | 3.6 |
| 2-12 | Vacuum evaporation | $78Li_2S-21.5P_2S_5-0.5Li_3PO_4$ | 41 | 3.6 |
| 2-13 | Vacuum evaporation | $78Li_2S-21.9P_2S_5-0.1Li_3PO_4$ | 40 | 3.6 |
| 2-14 | Vacuum evaporation | $78Li_2S-21P_2S_5-1Li_3PO_4$ | 41 | 3.7 |
| 2-15 | Vacuum evaporation | $75Li_2S-20P_2S_5-5Li_3PO_4$ | 43 | 3.8 |
| 2-16 | Sputtering | $78Li_2S-21.5P_2S_5-0.5Li_3PO_4$ | 41 | 3.6 |
| 2-17 | Laser abrasion | $78Li_2S-21.5P_2S_5-0.5Li_3PO_4$ | 41 | 3.6 |
| 2-18 | Ion plating | $78Li_2S-21.5P_2S_5-0.5Li_3PO_4$ | 41 | 3.6 |
| 2-19 | Laser abrasion | $75Li_2S-25P_2S_5$ | 38 | 3.0 |
| 2-20 | Laser abrasion | $75Li_2S-25P_2S_5$ | 38 | 3.0 |

TABLE 2

| No. | Thin-layer-forming temperature ° C. | Heat treatment temperature after thin-layer formation ° C. | Ionic conductivity (25° C.) S/cm | Number of stable charge-and-discharge cycles when used in lithium secondary battery |
|---|---|---|---|---|
| 2-1 | 140 | No heat treatment | $1.3 \times 10^{-3}$ | More than 600 |
| 2-2 | 140 | No heat treatment | $1.0 \times 10^{-3}$ | 450 |
| 2-3 | 140 | No heat treatment | $1.3 \times 10^{-3}$ | More than 600 |

TABLE 2-continued

| No. | Thin-layer-forming temperature ° C. | Heat treatment temperature after thin-layer formation ° C. | Ionic conductivity (25° C.) S/cm | Number of stable charge-and-discharge cycles when used in lithium secondary battery |
|---|---|---|---|---|
| 2-4 | 140 | No heat treatment | $1.5 \times 10^{-3}$ | More than 600 |
| 2-5 | 140 | No heat treatment | $1.5 \times 10^{-3}$ | More than 600 |
| 2-6 | 140 | No heat treatment | $1.5 \times 10^{-3}$ | More than 600 |
| 2-7 | 140 | No heat treatment | $1.3 \times 10^{-3}$ | More than 600 |
| 2-8 | 140 | No heat treatment | $1.0 \times 10^{-3}$ | 480 |
| 2-9 | 140 | No heat treatment | $1.5 \times 10^{-3}$ | More than 600 |
| 2-10 | 140 | No heat treatment | $1.5 \times 10^{-3}$ | More than 600 |
| 2-11 | 140 | No heat treatment | $1.5 \times 10^{-3}$ | More than 600 |
| 2-12 | Room temperature (25° C.) | 150 | $1.5 \times 10^{-3}$ | More than 600 |
| 2-13 | 140 | No heat treatment | $1.4 \times 10^{-3}$ | More than 600 |
| 2-14 | 140 | No heat treatment | $1.5 \times 10^{-3}$ | More than 600 |
| 2-15 | 140 | No heat treatment | $1.4 \times 10^{-3}$ | More than 600 |
| 2-16 | 130 | No heat treatment | $1.5 \times 10^{-3}$ | More than 600 |
| 2-17 | 130 | No heat treatment | $1.5 \times 10^{-3}$ | More than 600 |
| 2-18 | Room temperature (25° C.) | 150 | $1.5 \times 10^{-3}$ | More than 600 |
| 2-19 | 170 | No heat treatment | $1.5 \times 10^{-3}$ | More than 600 |
| 2-20 | Room temperature (25° C.) | 170 | $1.4 \times 10^{-3}$ | More than 600 |

Lithium secondary batteries were produced by a method similar to that employed in Example 1. A negative electrode was produced by using a substrate having a thin inorganic solid electrolytic layer formed on the thin metallic-lithium layer. The batteries were composed of the negative electrode, a separator made of porous polymer film, a positive electrode, an organic electrolysis solution, and so on.

The charge-and-discharge performances of the produced batteries were evaluated. Each battery showed the following results: With a charged voltage of 4.2 V, when the battery was discharged at a rate of 100 mA, it showed a current capacity of 0.5 Ah (ampere hour) before the terminal voltage decreased to 3.0 V. The energy density was in the range of 450 to 550 Wh/l (watt hour/liter).

The charge-and-discharge cycle was repeated under the same condition as described above. Excepting Sample No. 2-2, which contained an excessive amount of Li, and Sample No. 2-8, which contained an insufficient amount of Li, the batteries were stable after more than 600 cycles. Even after 600 cycles, they retained at least 50% of the initial capacity.

EXAMPLE 3

In this example, thin inorganic solid electrolytic layers were formed on thin metallic-lithium layers by using a process similar to that used in Sample No. 2-5 in Example 2. Lithium secondary batteries were produced by changing the thickness of the nitride layer. The evaluation results of the batteries are shown in Table 3.

TABLE 3

| No. | Thin-layer-forming method | Material for thin inorganic solid electrolytic layer (Mole ratio) | Ion-beam treatment | Thickness of nitride layer | Thin-layer-forming temperature ° C. | Number of stable charge-and-discharge cycles when used in lithium secondary battery |
|---|---|---|---|---|---|---|
| 3-0 | Vacuum evaporation | 78Li$_2$S-21.5P$_2$S$_5$-0.5Li$_3$PO$_4$ | No ion-beam treatment | None | 140 | 510 |
| 3-1 | Vacuum evaporation | 78Li$_2$S-21.5P$_2$S$_5$-0.5Li$_3$PO$_4$ | Argon-ion-beam irradiation | None | 140 | 590 |
| 3-2 | Vacuum evaporation | 78Li$_2$S-21.5P$_2$S$_5$-0.5Li$_3$PO$_4$ | Argon(75%)-nitrogen(25%)-ion-beam irradiation | 1 nm | 140 | More than 600 |
| 3-3 | Vacuum evaporation | 78Li$_2$S-21.5P$_2$S$_5$-0.5Li$_3$PO$_4$ | Argon(75%)-nitrogen(25%)-ion-beam irradiation | 5 nm | 140 | More than 600 |
| 3-4 | Vacuum evaporation | 78Li$_2$S-21.5P$_2$S$_5$-0.5Li$_2$PO$_4$ | Argon(75%)-nitrogen(25%)-ion-beam irradiation | 10 nm | 140 | More than 600 |
| 3-5 | Vacuum evaporation | 78Li$_2$S-21.5P$_2$S$_5$-0.5Li$_3$PO$_4$ | Argon(75%)-nitrogen(25%)-ion-beam irradiation | 50 nm | 140 | 570 |
| 3-6 | Vacuum evaporation | 78Li$_2$S-21.5P$_2$S$_5$-0.5Li$_3$PO$_4$ | Argon(75%)-nitrogen(25%)-ion-beam irradiation | 100 nm | 140 | 520 |
| 3-7 | Vacuum evaporation | 78Li$_2$S-21.5P$_2$S$_5$-0.5Li$_3$PO$_4$ | Argon(75%)-nitrogen(25%)-ion-beam irradiation | 200 nm | 140 | 450 |

As can be seen from Table 3, it is desirable that the nitride layer have a thick-ness of at least 1 nm and at most 100 nm, more desirably at least 1 nm and at most 10 nm.

Sample No. 3-1 was produced by forming the thin inorganic solid electrolytic layer some time after finishing the argon-ion-beam irradiation for the removal of an oxide layer, a carbonate layer, and other compound layers. This thin-layer-forming method is explained in Example 1.

EXAMPLE 4

In this example, thin inorganic solid electrolytic layers were formed on thin metallic-lithium layers by using a process similar to that used in Example 2 to produce and evaluate lithium secondary batteries. In place of the argon-nitrogen-mixed gas used in Example 2, an argon gas having a purity of 99.9999% was used for the etching treatment. After the etching, the thin inorganic solid electrolytic layers were formed without forming a nitride layer. The following data were taken on the obtained thin inorganic solid electrolytic layers: (a) the ratio of the constituent Li (atom. %), (b) the ionic conductivity at 25° C., and (c) the ratio X/Y calculated by using the ratio of the constituent Li, X, and the ratio of the constituent P, Y. Tables 4 and 5 show the thin-layer-forming conditions, the ionic conductivity, and the ratio X/Y (expressed as an Li/P ratio in Table 4).

TABLE 4

| No. | Thin-layer-forming method | Material for thin inorganic solid electrolytic layer (Mole ratio) | Ratio of constituent Li (atom. %) | Li/P ratio |
| --- | --- | --- | --- | --- |
| 4-1 | Laser abrasion | 75Li$_2$S-25P$_2$S$_5$ | 38 | 3.0 |
| 4-2 | Laser abrasion | 75Li$_2$S-25P$_2$S$_5$ | 37 | 2.9 |
| 4-3 | Laser abrasion | 70Li$_2$S-30P$_2$S$_5$ | 33 | 2.5 |
| 4-4 | Laser abrasion | 70Li$_2$S-30P$_2$S$_5$ | 34 | 2.6 |
| 4-5 | Sputtering | 80Li$_2$S-20P$_2$S$_5$ | 42 | 4.0 |
| 4-6 | Ion plating | 80Li$_2$S-20P$_2$S$_5$ | 41 | 3.9 |
| 4-7 | Vacuum evaporation | 70Li$_2$S-30P$_2$S$_5$ | 30 | 2.3 |

TABLE 5

| No. | Thin-layer-forming temperature ° C. | Heat treatment temperature after thin-layer formation ° C. | Ionic conductivity (25° C.) S/cm | Number of stable charge-and-discharge cycles when used in lithium secondary battery |
| --- | --- | --- | --- | --- |
| 4-1 | 160 | No heat treatment | 3.0 × 10$^{-4}$ | More than 500 |
| 4-2 | Room temperature (25° C.) | 160 | 2.5 × 10$^{-4}$ | More than 500 |
| 4-3 | 170 | No heat treatment | 3.5 × 10$^{-4}$ | More than 500 |
| 4-4 | Room temperature (25° C.) | 170 | 4.0 × 10$^{-4}$ | More than 500 |
| 4-5 | 165 | No heat treatment | 2.0 × 10$^{-4}$ | More than 500 |
| 4-6 | 165 | No heat treatment | 3.0 × 10$^{-4}$ | More than 500 |
| 4-7 | 165 | No heat treatment | 3.0 × 10$^{-4}$ | More than 500 |

As can be seen from Table 5, each sample had an ionic conductivity more than 1×10$^{-4}$ S/cm. An analysis of the composition from the thin inorganic solid electrolytic layer to the thin metallic-lithium layer was conducted by using the same XPS as used in Example 1. The analysis confirmed that the oxygen content varied gradually from the electrolytic layer to the lithium layer at the boundary zone between the two layers. It was confirmed that the oxide layer on the surface of the metallic lithium was removed nearly completely before the formation of the thin inorganic solid electrolytic layer. A charge-and-discharge cycle test was conducted under the same condition as in Example 2. As shown in Table 5, the batteries were stable after more than 500 cycles. Even after 500 cycles, they retained at least 50% of the initial capacity.

INDUSTRIAL APPLICABILITY

As explained above, the inorganic solid electrolyte of the present invention contains no Si and consequently can suppress the degradation of the electrolytic layer due to the reaction between metallic lithium and silicon sulfide. In particular, the method of the present invention forms the electrolytic layer directly on the lithium-containing metal by nearly completely removing the oxygen-containing layer on the surface of the lithium-containing metal. The practical absence of the oxygen-containing layer between the electrolytic layer and the lithium-containing metal enables not only the reduction in the resistance at the interface between the two members but also the accomplishment of high ionic conductivity.

The invention claimed is:

1. A method of forming an inorganic solid electrolyte by forming a thin inorganic solid electrolytic layer on a substrate, the method comprising the step of forming a thin inorganic solid electrolytic layer comprising Li, P, and S without containing Si while the substrate is heated at a temperature of at lowest 40° C. and at highest 180° C.

2. A method as defined by claim 1, wherein the inorganic solid electrolyte comprises:
    (a) at least 20 atom. % and at most 60 atom. % Li; and
    (b) the remainder comprising P and S.

3. A method as defined by claim 1, wherein the inorganic solid electrolytic layer is formed by a method selected from the group consisting of the sputtering method, the vacuum evaporation method, the laser abrasion method, and the ion plating method.

4. A method as defined by claim 1, the method comprising the steps of:
    (a) etching the surface of the substrate by irradiating the surface with inert-gas ions; and
    (b) forming the thin inorganic solid electrolytic layer such that at least part of the forming step is performed concurrently with the etching step.

5. A method as defined by claim 1, comprising forming the thin inorganic solid electrolyte layer directly on the substrate.

6. A method of forming an inorganic solid electrolyte by forming a thin inorganic solid electrolytic layer on a substrate, the method comprising the steps of:
    (a) forming a thin inorganic solid electrolytic layer comprising Li, P, and S without containing Si while the substrate is maintained at a temperature lower than 40° C.; and
    (b) heating the substrate having the formed electrolytic layer at a temperature of at lowest 40° C. and at highest 180° C.

7. A method as defined by claim 6, wherein the inorganic solid electrolyte comprises:
    (a) at least 20 atom. % and at most 60 atom. % Li; and
    (b) the remainder comprising P and S.

8. A method as defined by claim 6, wherein the inorganic solid electrolytic layer is formed by a method selected from the group consisting of the sputtering method, the vacuum evaporation method, the laser abrasion method, and the ion plating method.

9. A method as defined by claim 6, the method comprising the steps of:
    (a) etching the surface of the substrate by irradiating the surface with inert-gas ions; and
    (b) forming the thin inorganic solid electrolytic layer such that at least part of the forming step is performed concurrently with the etching step.

* * * * *